United States Patent Office 2,816,099
Patented Dec. 10, 1957

2,816,099
PROCESS OF MAKING UREA DERIVATIVES OF PROTEINS

Harland H. Young, Western Springs, and Edward F. Christopher, Chicago, Ill., assignors to Swift & Company, Chicago, Ill., a corporation of Illinois No Drawing. Application September 9, 1955, Serial No. 533,522

11 Claims. (Cl. 260—117)

This invention relates in general to protein isocyanic acid derivatives and their preparation. More particularly, the invention concerns the treatment of water sensitive proteinaceous materials in the presence of isocyanic acid whereby substituted urea compounds or carbamyl protein derivatives are obtained.

The generally used processes for manufacturing protein isocyanate derivatives require the use of isocyanic acid esters. These esters, however, are unstable and react with moisture. Therefore, any reaction requiring the use of such esters is usually carried out in an inert anhydrous medium. Additionally, the substituted urea products secured when isocyanic esters are used are, under certain circumstances, resistant to further treatment, e. g. resinification with formaldehyde. Finally, they are highly moisture resistant and water insoluble thereby limiting their usefulness in a number of applications.

It is therefore an object of this invention to provide a process whereby proteinyl ureas may be formed without requiring the use of isocyanic acid esters.

A further object of this invention is to provide a process which may be readily carried out in an aqueous medium.

Another object is to provide protenyl urea compounds, which, because of their controllable reactivity with formaldehyde find utility in improving certain properties of animal glue.

A final object is to produce protein derivatives which retain their solubility in water thereby preserving their utility in aqueous systems.

Further objects, if not specifically set out, will become apparent to one skilled in the art during the course of the description which follows.

Broadly, the present invention comprises treating protein materials and their hydrolysis or partial degradation products with isocyanic acid, the latter being generated in situ from a suitable salt or other compound which may be caused to release isocyanic acid in a smooth readily controlled fashion. The nascent acid liberated reacts substantially quantitatively with the free amino groups of the protein provided that the pH of the solution within the vessel is maintained very slightly on the acid side. The products are substituted urea compounds, ammonia and carbon dioxide, the latter two resulting from the decomposition of any excess isocyanic acid.

More specifically, the invention contemplates generating isocyanic acid by placing a suitable cyanic acid salt or other cyanic acid derivative in a mildly acidic bath. Sodium, potassium and ammonium cyanates are typical of the water soluble salts which may be employed. Additionally, less soluble metallic cyanates may be used as may other compounds which decompose in warm water to form isocyanic acid. Nitrourea and cyanuric acid are members of this family of compounds. As ultimate sources of cyanuric acid, cyanuric chloride, cyamelide, melamine, ammelide, ammeline, melam, melem, melon and cyamelon are worthy of mention. All may be hydrolyzed to form the desired cyanuric acid.

Since isocyanic acid is extremely unstable and readily decomposes or hydrolyzes to carbon dioxide and ammonia, the conditions within the reaction chamber must be carefully controlled if the nascent acid is to be effectively used. As alkaline conditions cause too rapid hydrolysis of isocyanic acid with consequent waste of the gas, the pH is preferably maintained somewhat below 7, preferably between 5.5 and 6.8. Substantially lower pH levels tend to promote hydrolysis. The use of slightly acid conditions insures a slow orderly liberation of cyanic acid which in turn immediately tautomerizes to the desired isocyanic acid.

The temperatures prevailing within the reaction vessel are determined by the properties of the proteins present. While proteins having a tendency to gelatinize at low levels must be heated, the reaction temperature is preferably kept below 130° F. thereby avoiding excessive hydrolysis of the isocyanic acid. Room temperatures are suitable if casein, soybean, cottonseed, or peanut proteins are selected. But animal glue or glue solutions are preferably reacted at about 110°–130° F. so as to prevent gelation.

The proper concentration of isocyanic acid or its source material may be determined by ascertaining the number of protein amino groups available for reaction. The Van Slyke titration method for free amino groups is suitable for making such a determination. Most proteins, e. g. blood, keratins (horns, wool and feathers), vegetable proteins (cotton, peanut and soybean), collagen, glue and gelatin require from 1 to 3% potassium cyanate, based upon the weight of the protein. Somewhat more isocyanic acid is necessary where protein degradation products are selected as reactants such as these having a higher free amino group content. In all events, about one mol isocyanic acid should be supplid for each mol of protein having one free amino group. As a certain amount of hydrolysis and other side reactions take place, about 1½ times the calculated isocyanic acid requirements are generally employed. Factors limiting the isocyanic acid concentration are the cost of the acid producing reagent and the fact that if the alkali metal salts are selected as isocyanic acid precursors, an excessive alkalinity will be imparted. As has been indicated above, the results here may be the generation of isocyanic acid at a rate appreciably greater than that at which it reacts. At least 15 minutes and generally about one hour are required for the complete conversion of the protein to the proteinyl urea.

A number of examples are set out below as illustrations of the process of the present invention and the product secured. They are not, however, intended to be construed as placing limitations on the scope of the invention other than those set out in the appended claims.

Example I 500 g. of acid cured gelatin liquor containing 10% solids was warmed until fluid (120° F.). The pH was adjusted from 4.5 (original) to 6–6.8 with sodium hydroxide and a solution of 1 g. potassium cyanate in 9 g. water was slowly added with stirring. A very slight evolution of gas became apparent but this was minimized by diminishing the rate at which the cyanate was added. The final reaction product did not appear greatly different since it retained its gelling power and viscosity. A major change, however, was found in its isoelectric point which was lowered from 8.6 to 5.7. The product was dried and ground in the conventional manner.

Example II 500 g. of bone glue liquor containing 40% solids was warmed to 110° F. until melted. The pH was adjusted from 6.8 to 5.8 and there was slowly added a solution containing 4 g. of sodium cyanate dissolved in 36 g. of water. The solution was held at 110–115° F. for one hour and was finally dried and ground in the usual manner. The isoelectric point was lowered by this treatment from 6.5 to 5.0.

Example III 100 g. of casein was swollen in 300 g. of water and stirred while cold. 3 g. of potassium cyanate dissolved in 27 g. of water was added slowly with constant stirring. The casein continued to swell and gelatinize. After 15 minutes the solution was warmed on the steam bath to a temperature of 120° F. and held for 30 minutes until a smooth solution was obtained.

Example IV 100 g. of soybean protein was swollen in 300 g. of water and stirred while cold. 3 g. of potassium cyanate dissolved in 27 g. of water was added slowly with constant stirring. The soybean protein continued to swell and gelatinize. After 15 minutes the solution was warmed on the steam bath to a temperature of 120° F. and held for 30 minutes until a smooth solution was obtained.

Example V 100 g. of cottonseed protein was swollen in 300 g. of water and stirred while cold. 3 g. of potassium cyanate dissolved in 27 g. of water was added slowly with constant stirring. The cottonseed protein continued to swell and gelatinize. After 15 minutes, the solution was warmed on the steam bath to a temperature of 120° F. and held for 30 minutes until a smooth solution was obtained.

Example VI 100 g. of peanut protein was swollen in 300 g. of water and stirred while cold. 3 g. of potassium cyanate dissolved in 27 g. of water was added slowly with constant stirring. The peanut protein continued to swell and gelatinize. After 15 minutes the solution was warmed on the steam bath to a temperature of 120° F. and held for 30 minutes until a smooth solution was obtained.

Example VII 100 g. fresh whole ox blood was adjusted to a pH of 5.5 and a solids content of 20%. While stirring at room temperature a solution of 3 g. potassium cyanate dissolved in 27 g. water was slowly added. The reaction continued for 30 minutes and was complete. Due to the complicated mixture of proteins present in whole blood no determination of isoelectric point was made.

Example VIII 500 g. concentrated tank rendering water substantially free of fat was concentrated by evaporation to 100 g. of 20% solids liquor. 2 g. sodium cyanate dissolved in 15 g. water was added to the liquor previously adjusted to a pH of 6.0. The reaction was run at 110° F. for one hour and the product subsequently evaporated to a solids content of 60%.

Example IX 500 g. of a 40% solids bone glue liquor was treated with 5 g. of nitrourea and stirred with heating to a temperature of 190° F. Nitrous oxide was evolved and after 30 minutes the reaction was complete. The product was dried and ground in the usual way.

Example X 1200 g. of washed degreased minced pork skins were soaked cold in sufficient water to cover, which water contained 12 g. of potassium cyanate. The soaking was continued for approximately 7 hours or until the cyanate had permeated the skin surfaces. After washing the excess cyanate away, the skins were cured in dilute mineral acid as is customary in the manufacture of gelatin. The acid cured skins were then extracted to remove the gelatin which was processed in a conventional fashion. The gelatin produced was to a large extent converted into a proteinyl urea derivative as shown by the fact that its isoelectric point was 4.5 rather than 8.5 which is that normally found for acid cured gelatin.

The process set forth above is to be clearly distinguished from that wherein amines and amino acids react with isocyanic acid to yield the corresponding ureido derivatives. There, successful completion of the reaction requires the presence of a mineral acid either initially (e. g. when the amine salt is added) or at least before isolation of the desired ureido derivative. Thus, while the amino acid exists normally in the "Zwitter-ion" state, the compound reacting with isocyanic acid is actually the salt of an amine with a mineral acid. However, where a substance like an amino acid is replaced with a more complex protein molecule, the reaction occurs not in strongly acid media (as does the amine), but at a nearly neutral pH close to the isoelectric point. The reaction between isocyanic acid and protein differs, therefore, from that between isocyanic acid and an amine substance in that in the case of the former, the "Zwitter-ion" form of the protein molecule is involved. In the case of the amine, this is not true.

The protein isocyanate or substituted urea compounds described are believed to possess the general formula:

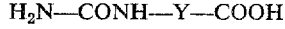

$$H_2N\text{---}CONH\text{---}Y\text{---}COOH$$

wherein Y designates a protein grouping. They are thought to be analogous to the corresponding ureido derivatives in structure. Further, the isocyanic acid reaction product has a low isoelectric point, indicating reaction at an aminoid center.

These products are particularly useful in glue manufacture. The presence of a urea unit in a protein-formaldehyde glue markedly increases its jelly strength, viscosity and adhesive strength.

Also, the protein-isocyanic acid products of this invention may be used as the protein colloids in glue compositions directly without first being polymerized with formaldehyde. They are particularly valuable here because, as pointed out above, they have isoelectric points substantially below those of the proteins from which they are derived. Since proteins tend to precipitate out of solution at their isoelectric points, this lowering effect enables the manufacture of glues which are stable over a considerably wider pH range than has been possible in the past.

Additionally, normally insoluble casein, soybean and peanut proteins may be readily solubilized by treatment with small amounts of isocyanic acid salts. These products find utility in a variety of industries. In addition to glue manufacture, they are used in sizing, foam stabilization and elsewhere. The mechanism of the reaction is the same here as that previously discussed. The isocyanic acid reacts with the free amino groups in the amino acids to form substituted ureas. These substituted ureas are more acid than the free amino group originally present. Consequently, the protein product becomes more acidic and the isoelectric point is lowered.

Obviously many modifications and variations of the invention as hereinbefore set forth may be made without departing from the spirit and scope thereof and therefore only such limitations should be imposed as are indicated in the appended claims.

We claim:

1. A process for introducing a carbamyl radical into a protein molecule which comprises: forming an aqueous solution of a material which evolves isocyanic acid in the presence of water and admixing to said aqueous solution a protein material; and thereafter reacting said isocyanic acid with the free amino groups of said protein.

2. The process of claim 1 wherein the isocyanic acid evolving material is a metallic salt of cyanic acid.

3. The process of claim 1 wherein the isocyanic acid evolving material is syanuric acid.

4. A process for preparing proteinyl urea which comprises: placing in aqueous solution a material which is the presence of water evolves isocyanic acid; adding thereto a protein material; and thereafter reacting said isocyanic acid with the free amino groups of said protein.

5. A process for preparing a proteinyl urea which comprises: placing in aqueous solution a material which in the presence of water evolves isocyanic acid; adjusting the acidity of the solution so formed to a pH less than about 7; and adding thereto a protein material; and thereafter reacting said isocyanic acid with the free amino groups of said protein.

6. The process of claim 5 wherein the protein material is animal glue liquor.

7. The process of claim 5 wherein the protein material is a vegetable protein.

8. The process of claim 5 wherein the protein material is collagen.

9. The process of claim 5 wherein the protein material is a keratin.

10. A process for lowering the isoelectric point of gelatin obtained from animal skins which comprises: soaking said animal skins in an aqueous solution of a material which evolves isocyanic acid in the presence of water and holding the skins in said solution until the cyanate permeates the skin surfaces, said isocyanic acid reacting with the free amino groups of the protein in said skin.

11. A process for lowering the isoelectric point of proteinaceous material which comprises: soaking said proteinaceous material in an aqueous solution of a material which evolves isocyanic acid in the presence of water; holding said proteinaceous material in said solution until the cyanate permeates said proteinaceous material, said isocyanic acid reacting with the free amino groups of the protein.

References Cited in the file of this patent

UNITED STATES PATENTS

| 2,449,613 | Muller et al. | Sept. 21, 1948 |
| 2,684,282 | Wormell et al. | July 20, 1954 |
| 2,719,146 | Schwander | Sept. 27, 1955 |

FOREIGN PATENTS

| 614,506 | Great Britain | Dec. 16, 1948 |

OTHER REFERENCES

Sah: Chem. Abst., vol. 28, col. 6122 (1934).

Sah et al.: Chem. Abst., vol. 31, col. 6203 (1937).

Anson et al.: "Advances in Protein Chem.," vol. III, pp. 199–201 (1947).

UNITED STATES PATENT OFFICE

CERTIFICATE OF CORRECTION

Patent No. 2,816,099            December 10, 1957

Harland H. Young et al.

It is hereby certified that error appears in the printed specification of the above numbered patent requiring correction and that the said Letters Patent should read as corrected below.

Column 1, line 39, for "protenyl" read -- proteinyl --; column 2, line 37, for "supplid" read -- supplied --; column 4, line 30, for "area" read -- urea --; column 5, line 6, for "syanuric" read -- cyanuric --.

Signed and sealed this 21st day of January 1958.

(SEAL)

Attest:

KARL H. AXLINE            ROBERT C. WATSON
Attesting Officer            Commissioner of Patents